United States Patent [19]

Stoye et al.

[11] 4,024,317
[45] May 17, 1977

[54] PROCESS FOR COATING PRETREATED VULCANIZED ARTICLES OF SATURATED OR UNSATURATED POLYOLEFIN RUBBER

[75] Inventors: Dieter Stoye, Marl; Werner Andrejewski, Gahlen; Adolf Dräxler, Marl, all of Germany

[73] Assignee: Chemische Werke Huls Aktiengesellschaft, Marl, Germany

[22] Filed: Oct. 9, 1975

[21] Appl. No.: 621,167

Related U.S. Application Data

[63] Continuation of Ser. No. 390,251, Aug. 21, 1973, abandoned.

[30] Foreign Application Priority Data

Aug. 23, 1972  Germany ............................ 2241413

[52] U.S. Cl. ..................... 428/423; 427/54; 427/322; 428/500; 428/523
[51] Int. Cl.² ............................................. B32B 27/40
[58] Field of Search ............ 427/307, 322, 54; 428/423, 500, 523; 260/75 NK

[56] References Cited

UNITED STATES PATENTS

| 2,956,961 | 10/1960 | Kibler et al. ............... 427/373 |
| 3,080,255 | 3/1963 | Winkelmann ............... 428/413 |
| 3,214,411 | 10/1965 | Saunder et al. ............. 260/75 |
| 3,547,889 | 12/1970 | Schutze et al. ............. 428/423 |
| 3,600,289 | 8/1971 | Bragole ...................... 260/75 |
| 3,695,918 | 10/1972 | Ward .......................... 427/207 |

FOREIGN PATENTS OR APPLICATIONS 1,046,230 10/1958 Germany
1,919,554 1/1971 Germany

OTHER PUBLICATIONS

Rubber World, "EPDM Breakthrough in Automotive Trim", Feb. 1972, pp. 31–35.

*Primary Examiner*—Ronald H. Smith
*Assistant Examiner*—Sadie L. Childs
*Attorney, Agent, or Firm*—Millen & White

[57] ABSTRACT

Polyolefin rubber is coated with an isocyanate-curing varnish whose binder is a mixture of (a) a saturated oligoester resin containing hydroxyl groups and having a molecular weight of 250–3,500 and whose alcohol component is at least difunctional and 20–100 mole percent of which is 1,4-bis(hydroxymethyl)cyclohexane; and (b) a di- or poly-functional isocyanate or mixture thereof, wherein the ratio of isocyanate groups of the isocyanate to the hydroxyl groups of the oligoester resins is about 0.75 : 1 to 1 : 1, by pre-treating the vulcanized rubber article with a strong oxidizing agent or by irradiation with ultraviolet light.

9 Claims, No Drawings

PROCESS FOR COATING PRETREATED VULCANIZED ARTICLES OF SATURATED OR UNSATURATED POLYOLEFIN RUBBER

This is a continuation of application Ser. No. 390,251, filed Aug. 21, 1973, now abandoned.

BACKGROUND OF THE INVENTION

This invention relates to a novel process for coating of vulcanized saturated or unsaturated polyolefin rubber articles with an isocyanate-curing varnish.

It is not customary to varnish vulcanized rubber articles, since they are utilized predominantly for their functional characteristics rather than their appearance. However, exceptions are known in the case of certain rubber materials employed in connection with articles substantially affected by the design of the article, e.g., coated vulcanized articles of saturated or unsaturated polyolefin rubbers employed in the automobile industry.

"Rubber World," February 1972, pp. 31 et seq., discloses a process for varnishing vulcanized unsaturated ethylenepropylene rubber articles with isocyanate-curing varnishes. In this process, the surface of the article to be varnished is pretreated in a multistage process involving cleaning, sensitizing and UV radiation. Following this pre-treatment, the actual varnishing is carried out in a two-stage process in which a primer is first applied over which, after curing, is applied a top coat of varnish.

This state-of-the-art process is complicated, due to its many process steps, and thus is uneconomical.

Therefore, it is an object of this invention to develop a coating process in which a coating is applied to vulcanized saturated or unsaturated polyolefin rubber articles in a simpler manner, using isocyanate-curing varnishes to provide a coating which has good adhesion, high elasticity, a scratch-proof surface and optionally, high gloss. Other objects will be apparent to those skilled in the art to which this invention pertains.

SUMMARY OF THE INVENTION

According to the process of this invention, vulcanized saturated or unsaturated polyolefin rubber articles are coated by pretreating the articles, viz., with a solution of a strong oxidizing agent or by irradiation with UV light, and thereafter treating the pretreated article with a coating agent whose binder is a mixture of a. a saturated oligoester resin containing hydroxyl groups and having a molecular weight of 250 – 3,500 and whose alcohol component is at least difunctional and 20–100 mole percent of which is 1,4-bis(hydroxymethyl)cyclohexane; and b. a di- or poly-functional isocyanate or mixture thereof, wherein the ratio of isocyanate groups of the isocyanate to the hydroxyl groups of the oligoester resins is about 0.75 : 1 to 1 : 1.

DETAILED DISCUSSION

Saturated and unsaturated polyolefin rubbers which can be employed in the process of this invention are copolymers prepared from a mixture of ethylene and one or more α-olefins of 3–8 carbon atoms and, optionally, one or more multiple olefins, employing the so-called Ziegler-Natta catalysts, which can additionally contain activators and modifiers, in a solution or dispersion at temperatures of −30° to −100° C., e.g., in accordance with German Unexamined Applications DOS 1,570,352; (U.S. Pat. No. 3,629,212); 1 595 442 (U.S. Pat. No. 3,622,548); and 1720450 (U.S. Pat. No. 3,645,993). The exact chemical composition of the starting mixed polyolefin is not critical, since all possess the property of being difficult to coat satisfactorily with a varnish.

Preferred are saturated polyolefin rubbers consisting of 30–90% by weight of ethylene and 70–10% by weight of propylene and/or butene-1, and unsaturated polyolefin rubbers produced from, in addition to ethylene and propylene and/or butene-1 within the percentage limits stated above in connection with the saturated polyolefin rubbers, a multiple olefin, e.g., containing 4–8 carbon atoms, in such an amount that the resultant rubber contains 0.5 – 30 double bonds per 1,000 carbon atoms. Especially preferred mulitple olefins are cis- and trans-1,4-hexadiene, dicyclopentadiene, methylene-, ethylidene- and propenyl-norbornene.

The articles formed from these saturated or unsaturated polyolefin rubbers, optionally filled with carbon black and/or other conventional fillers, are vulcanized during or after the shaping thereof in a conventional manner, before they are coated in accordance with the process of this invention. Typical articles of vulcanised rubbers are for example bumper assemblies.

It is to be understood that the starting vulcanized rubbers are a well known class of rubbers and their preparation and properties are well known to those skilled in the art. There is nothing critical about these starting rubbers. All that is required is that they be an ethylene/α-olefin of 3–8 carbon atoms saturated or unsaturated rubber as defined hereinabove.

The first step of the process of this invention resides in a one-stage pretreatment of the surface of the articles to be coated with a strong oxidizing agent or its optionally aqueous solution or by irradiation with UV light.

This pretreatment results in a good adhesive strength when a coating as defined hereinafter is subsequently applied to the pretreated vulcanized articles.

The term "strong oxidizing agent" as used herein means agents which are able to oxidize the surface of the vulcanised articles.

Examples of strong oxidizing agents which can be used for the pretreatment are chromic acid, peroxyacetic acid, potassium permanganate, chlorine, hypochlorites, e.g., sodium hypochlorite, nitric acid, mixtures of nitric acid with hydrochloric acid, and especially chromic and chromosulfuric acid. Liquid oxidizing agents can be used without dilution or, like the solid oxidizing agents, as a solution, e.g., in water. The exact concentration of the solution is not critical, since the concentration of the oxidizing agent only affects the optimum contact time with the vulcanized article.

The oxidizing agent or, optionally, an aqueous solution thereof, is allowed to contact the surface of the articles, e.g., for about 1–30 minutes at about 100° to 15° C., the time of treatment being inversely proportional to the treatment temperature.

After the treatment, the articles are thoroughly washed with water to remove the oxidizing agent and dried. During the pretreatment with UV light, the articles are generally first cleaned with a solvent, e.g., an aromatic hydrocarbon, ketone and/or ester and then dried, and thereafter irradiated. The optimum UV pretreatment period, for example, under a quartz lamp of the type B 500 of the firm Quarzlampen GmbH, Hanau, Fed. Rep. of Germany (which lamp has an electrical power of 450 watts) with a predetermined distance of 30 cm. between the lamp and the article to be pretreated, is about 30 minutes, which time can be shortened with higher electrical power and/or smaller lamp-object distance. Generally, preferred electrical powers are about 50 to 200 watts/cm length of electric arc whereby the electrical power of the lamps is about 400 to 500 watts. The minimal density of the radiation energy should be between about 0.5 and 0.1 joule/cm$^2$.

Of the two pretreatment methods, the pretreatment with strong oxidizing agents is preferred, since this process can be conducted by the economically more advantageous dipping method. By this method, the surface of the shaped article is also pretreated at those points on its surface which are accessible to UV only with difficulty. In contrast thereto, when pretreating with UV light, a uniform radiation density on the surface of shaped articles is achieved only by a larger technical expenditure, due to the linear propagation of UV radiation.

Following the pretreatment step, the pretreated vulcanized article is then coated with the coating agent. The coating agent can be applied by a casting process as well as by the one- or two-component spraying method.

The coating agent is one whose binder is a heat-curing mixture of a free-hydroxyl group-containing oligoester resin and a di- or poly-functional isocyanate in a proportion such that the ratio of isocyanate groups to free hydroxyl groups in the mixture is 0.75 : 1 to 1 : 1.

The saturated hydroxyl group-containing oligoester resins which are present as a component of the binder of the coating agent are characterized by a molecular weight of 250 to 3,500, preferably 1,000 to 3,000, and by an alcohol component 20–100 mole percent of which is 1,4-bis(hydroxymethyl)cyclohexane. The exact nature of the polyester component and any remainder of the alcohol component is not critical.

The 1,4-bis(hydroxymethyl)cyclohexane can be present in the oligoesters in its trans-form or cis-form, or as a mixture of both forms. For the production of linear saturated oligoester resins, one can utilize, in addition to 1,4-bis(hydroxymethyl)cyclohexane, 0–80 mole percent of another diol, e.g., ethylene glycol, 1,2-propanediol, 1,3-propanediol, 1,3-butanediol, 1,4-butanediol, hexanediols, 2-ethyl-1,3-hexanediol, or a mixture thereof. For the preparation of branched saturated oligoester resins, up to 40 mole percent of the alcohol component can be a tri- or higher-functional alcohol, e.g., glycerol, trimethylolpropane and pentaerythritol.

For the production of the linear or branched saturated oligoester resins, a mixture of an aromatic and/or cycloaliphatic acid and an aliphatic dicarboxylic acid is utilized, wherein the molar ratio of the aromatic and/or cycloaliphatic dicarboxylic acid to the aliphatic dicarboxylic acid is about 3:1 to about 1:1. Suitable aromatic or cycloaliphatic dicarboxylic acids are those conventionally employed in the production of oligoester resins, such as, for example, phthalic acid, isophthalic acid, hexahydroterephthalic acid, tetrahydrophthalic acid, hexahydrophthalic acid and mixtures thereof, wherein the cycloaliphatic dicarboxylic acids can be employed in their trans-form or cis-form, or as a mixture of both configurations.

Especially suitable as aliphatic dicarboxylic acids are succinic acid, glutaric acid, adipic acid, suberic acid, sebacic acid, decanedicarboxylic acid and mixtures thereof. However, it is also possible to use unsaturated dicarboxylic acids, e.g., maleic acid, fumaric acid, itaconic acid and citraconic acid. However, saturated aliphatic dicarboxylic acids are preferred.

In place of the free dicarboxylic acids, esters thereof with short-chain alkanols can also be utilized, e.g., a dimethyl, diethyl or dipropyl ester. Insofar as the dicarboxylic acids form anhydrides, these can also be employed instead of the free cid, e.g., phthalic anhydride, hexahydrophthalic anhydride, tetrahydrophthalic anhydride, succinic anhydride, glutaric anhydride and maleic anhydride.

The oligoesters can be prepared by numerous conventional processes, with or without a catalyst, with or without the introduction of an inert gas stream, in the form of a solution condensation, melt condensation or azeotropic esterification, at temperatures of up to 250° C. or higher, with the thus-liberated water or the thus-released alkanols being removed continuously. The esterification takes place almost quantitatively and can be followed by measuring hydroxyl and acid numbers. The molecular weight can be regulated in a simple manner by initial charging ratio of alcohol to dicarboxylic acid. For a further description of such oligoester resins, see the polyester starting materials for the coating compositions of U.S. Pat. Nos. 3,668,277 and 3,668,276.

Examples of suitable isocyanates are the commercially available di- and/or poly-functional isocyanates, e.g., "Desmodur" N and "Desmodur" L (Farbenfabriken Bayer A.G.), isophorone diisocyanate and trimethylhexamethylene diisocyanate.

In the binders, the ratio of isocyanate groups to hydroxyl groups of the oligoester resins is preferably 0.75 : 1 to 1 : 1.

For the production of the coatings, the oligoester resins are dissolved in a suitable inert solvnt, e.g., an aromatic hydrocarbon, such as, for example, toluene or xylene, optionally in combination with an ester, ketone or glycol ether ester solvent. The oligoester resin solution is mixed, optionally after the addition of a conventional pigment and/or auxiliary agent, with an above-described isocyanate, dissolved, for example, in an aromatic hydrocarbon, ester, ketone or glycol ether ester.

The coating agents can contain the customary additives and adjuvants, e.g., pigments, flow agents, for example, urea-formaldehyde resins, and cross-linking accelerators, e.g., dibutlytin dilaurate, zinc octoate and tertiary amines.

The adhesive strength of the coating can be increased by adding to the coating agent 5–30% by weight, based on the total binder, of an unsaturated, styrene-free polyester resin. Such polyester resins are commercially obtainable under the name "Kunstharz LTW" and "Kunstharz LTH", which are produced by condensation of a mixture of saturated and unsaturated dicarboxylic acids with polycyclic polyvalent alcohols.

Finally, the degree of luster of the coating can reproducibly be varied by adding a dulling agent, e.g., colloid-disperse silicic acids, talc and waxes.

The coating is then cured at a temperature of about 20° to 120° C., for from about 5 hours to about 2 minutes, the time being inversely proportionate to the temperature.

An amount of coating agent is applied which provides a dry layer coating thickness of about 10 to 80 microns. Generally, this means applying about 5 to 100 g coating solids per m² of surface area.

In accordance with the process of this invention, coatings can be applied simply and economically to vulcanized articles made of saturated or unsaturated polyolefin rubber, which coatings have good adhesive strength, high elasticity, excellent surface hardness and, optionally, high gloss.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE a. Coating Agent

A saturated oligoester resin is produced as follows: Under a nitrogen atmosphere and with constant removal of the water as it is formed, 1.296 g. of 1,4-bis(-hydroxymethyl)cyclohexane (9 mols), 276 g. of glycerin (3 mols), 888 g. of phthalic anhydride (6 mols), 730 g. of adipic acid (5 mols) and 200 g. of xylene are heated to 200° C. for 8 hours. The thus-produced polyester has an acid number of 4.5 mg. (KOH/g. After cooling the melt to 140° C. the polyester is dissolved in xylene to form a 60 percent solution.

The thus-produced resin, has an average molecular weight of 2,900 and an OH-number of about 85 mg. KOH/g. oligoester, 30 parts by weight of the oligoester-solution in xylene are pigmented with 25 parts by weight of titanium dioxide and mixed with 6 parts by weight of Kunstharz LTW" [synthetic resin LTW], as described before, dissolved in 4 parts by weight of xylene.

To the resulting mixture is added 5.0 parts by weight of the polyfunctional aliphatic isocyanate Desmodur N 100, dissolved in 1.5 parts by weight of a mixture of ethylene glycol acetate and xylene (weight ratio 1:1).

The resulting mixture of oligoester resin and isocyanate mixture is diluted with 21.5 parts by weight of the aforementioned mixture of ethylene glycol acetate and xylene.

b. Preparation of the Coatings and Testing of the Results

Shaped articles of a vulcanized ethylene/propylene rubber or ethylene/propylene/multiple olefin rubber is oxidatively pretreated with chromosulfuric acid for about 20 minutes at 30° C.

The pretreated rubber articles are coated with 60 g/m² of the coating agent prepared according to (a) by spraying from a spray gun. The coating is cured at 60° C. within 20 minutes. The coatings are tested after a 24-hour storage period at 23° C. The gloss is measured in accordance with Lange, the adhesive strength is tested by grid-like cutting test in which oblique cuts are applied to the varnish (45°), adhesive film is applied and then torn off (DIN 53 151), the elasticity is determined, and the xylene resistance is tested (15 minutes at 20° C., immersed in xylene), and the surface hardness is measured.

c. Test Results

All samples exhibited excellent varnish-technological properties, i.e., the article of vulcanized ethylene/propylene rubber, as well as the articles of vulcanized ethylene/propylene/multiple olefin rubber with the multiple olefin components dicyclopentadiene, ethylidenenorbornene and 1,4-hexadiene, as can be seen from the following list of properties:

Gloss : > 100% (in accordance with Lange)
Adhesion : very good, Gt = O (DIN 53 151)
Elasticity : very good, no tearing when articles are deformed
Xylene resistance : no effect detectable
Hardness : resistant to fingernail, scratchproof the following is a description of the vulcanized rubber articles which were coated according to the Example described above:

First of all sheets with a thickness of 6 mm was coated. Furthermore articles with a complicated form for example profiles with a longitudinal groove and parts of bumber assemblies of safty-cars.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for coating the surface of a vulcanized polyolefin rubber pretreated with chromosulfuric acid and curing the resultant coating, the improvement which comprises coating said surface with a varnish coating material consisting essentially of:
   a. a saturated oligoester resin dissolved in an inert solvent, said resin having a molecular weight of 250–3,500 and an alcohol component which is at least difunctional, contains free hydroxyl groups and consists essentially of 20–100 mole percent 1,4-bis(hydroxymethyl)cyclohexane, the acid component of said resin being a mixture of at least one aromatic or cycloaliphatic dicarboxylic acid with an aliphatic dicarboxylic acid in a molar ratio of 1–3 moles of cyclic dicarboxylic acid per mole of aliphatic dicarboxylic acid; and
   b. a di- or poly-functional isocyanate or mixture thereof, wherein the ratio of the isocyanate groups to the free hydroxyl groups of the oligoester resin is 0.75:1 to 1:1,
to form a polyolefin rubber coated with a varnish having xylene resistance, good adhesive strength, high elasticity and excellent surface hardness.

2. A process according to claim 1 wherein the vulcanized article is formed of an ethylene/propylene rubber.

3. A process according to claim 1 wherein the vulcanized article is formed of an ethylene/propylene/multiple olefin rubber.

4. A process according to claim 3 wherein the multiple olefin component of the rubber is 1,4-hexadiene, dicylcopentadiene, methylenenorbornene, ethylidenenorbornene or propenylnorbornene.

5. A process according to claim 1 wherein the vulcanized article is dipped in chromosulfuric acid for about 1–30 minutes at about 100° to 15° C.

6. A process according to claim 1, wherein said isocyanate is at least one of isophorone diisocyanate and trimethylhexamethylene diisocyanate.

7. A process according to claim 6, wherein said coating further comprises 5–30% by weight, based on the weight of components (a) and (b), of an unsaturated, styrene-free polyester resin obtained by the condensation of a mixture of saturated and unsaturated dicarboxylic acids with polycyclic polyvalent alcohols.

8. A process according to claim 6, wherein said coating further comprises a pigment, flow agent, cross-linking accelerator or dulling agent.

9. The product obtained according to the process of claim 6.

* * * * *